US011402192B2

(12) United States Patent
Baxter et al.

(10) Patent No.: US 11,402,192 B2
(45) Date of Patent: Aug. 2, 2022

(54) MEASURING TAPE WITH IMPROVED CASE DURABILITY

(71) Applicant: APEX BRANDS, INC., Apex, NC (US)

(72) Inventors: Adam Baxter, Raleigh, NC (US); Jonathan Siebert Beckwith, Raleigh, NC (US); Cecil Wilson, Sanford, NC (US); Vlad Patrangenaru, Ellicott City, MD (US)

(73) Assignee: APEX BRANDS, INC., Apex, NC (US)

( * ) Notice: Subject to any disclaimer, the term of this patent is extended or adjusted under 35 U.S.C. 154(b) by 0 days.

(21) Appl. No.: 17/258,865

(22) PCT Filed: Jul. 12, 2019

(86) PCT No.: PCT/US2019/041552
§ 371 (c)(1),
(2) Date: Jan. 8, 2021

(87) PCT Pub. No.: WO2020/014578
PCT Pub. Date: Jan. 16, 2020

(65) Prior Publication Data
US 2021/0325159 A1 Oct. 21, 2021

Related U.S. Application Data

(60) Provisional application No. 62/697,104, filed on Jul. 12, 2018.

(51) Int. Cl.
*G01B 3/1043* (2020.01)
*G01B 3/1056* (2020.01)
(52) U.S. Cl.
CPC ......... *G01B 3/1043* (2020.01); *G01B 3/1056* (2013.01)

(58) Field of Classification Search
CPC ..................... G01B 3/1043; G01B 3/1056
See application file for complete search history.

(56) References Cited

U.S. PATENT DOCUMENTS

| 5,588,220 | A | 12/1996 | Cousins et al. | |
|---|---|---|---|---|
| 6,536,698 | B2 * | 3/2003 | Hsu | G01B 3/1005 242/381.3 |

(Continued)

OTHER PUBLICATIONS

International Search Report and Written Opinion from related international application PCT/US2019/041552, dated Oct. 1, 2019, all pages cited in its entirety.

*Primary Examiner* — Yaritza Guadalupe-McCall
(74) *Attorney, Agent, or Firm* — Burr & Forman LLP

(57) ABSTRACT

A measuring tape device may include a housing having an aperture, a reel assembly enclosed within the housing, and a blade having a first end configured to extend from the housing through the aperture and a second end configured to be wound on the reel assembly. The housing may include a first case half and a second case half. The reel assembly may be configured to alternately allow the blade to be withdrawn from the reel assembly through the aperture or received in the aperture onto the reel assembly. The first case half and the second case half may be joined together via threaded fasteners inserted into respective portions of screw bosses formed in corresponding portions of the first and second case halves. Mating features may be provided on the first and second case halves to facilitate joining the first and second case halves. At least some of the mating features may be longer than others of the mating features, or a diameter of the screw bosses is about 1.5 time to about 2.5 times larger than a diameter of the threaded fasteners.

13 Claims, 5 Drawing Sheets

(56) References Cited

U.S. PATENT DOCUMENTS

| | | | |
|---|---|---|---|
| 6,760,979 B1* | 7/2004 | Hsu | G01B 3/1005 33/767 |
| 7,377,050 B2 | 5/2008 | Shute et al. | |
| 7,458,537 B2* | 12/2008 | Critelli | G01B 3/1005 242/376 |
| 8,898,922 B2 | 12/2014 | Bridges et al. | |
| 2003/0029955 A1* | 2/2003 | Hsu | G01B 3/1005 242/380 |
| 2004/0118003 A1* | 6/2004 | Hsu | G01B 3/1005 33/767 |
| 2004/0187336 A1* | 9/2004 | Lee | G01B 3/1041 33/761 |
| 2006/0266867 A1* | 11/2006 | Critelli | G01B 3/1005 242/375 |
| 2021/0325159 A1* | 10/2021 | Baxter | G01B 3/1056 |

* cited by examiner

MEASURING TAPE WITH IMPROVED CASE DURABILITY

CROSS REFERENCE TO RELATED APPLICATION

This application claims priority to U.S. application No. 62/697,104 filed Jul. 12, 2018, the entire contents of which are hereby incorporated by reference in its entirety.

TECHNICAL FIELD

Example embodiments generally relate to measuring tape devices, and particularly relate to a measuring tape that is structured to have improved durability.

BACKGROUND

Measuring tapes have been around for a very long time, and are common measuring tools used in numerous contexts to obtain linear measurements. Measuring tapes can come in many forms and may be made of cloth, fiber glass, metal, plastic, or the like. The materials used are often dictated by the specific measuring application. For example, tailors and dressmakers typically use a flexible tape that can be easily manipulated between two hands to measure a distance therebetween. However, for construction or carpentry applications, a stiff and often metallic tape is preferred to allow the measuring tape to be extended between a first location at which one end of the tape is anchored, and the location of the user at whose location the measuring tape is paid out from a reel assembly. The reel assembly may have a manual retracting mechanism or a self-retracting mechanism, typically depending upon the length of the measuring tape. For relatively short measuring tapes (e.g., 12 ft or 25 ft), self-retracting mechanisms are very common. For very long measuring tapes (e.g., larger than 100 ft), a manual retracting mechanism is typically employed.

The reel assembly can often also be locked at a given location so that, for example, the measuring tape can be locked with a given amount of the metallic tape ribbon extending out of the housing of the measuring tape. The locking mechanisms that support this functionality are typically embodied as a sliding lock button that is disposed on a top and/or front portion of the measuring tape housing. The housing is often formed from case halves that are joined together to enclose the tape and at least a drum and spring that are part of the reel assembly. A common failure mode for measuring tapes has been for the drum and spring, or other parts of the reel assembly to become inoperable after an impact event (e.g., dropping the measuring tape from a height). In some cases, the two case halves may become temporarily separated due to the impact, and the tape itself may become bound in the gap formed between the two case halves. In other cases, the drum and spring may become disengaged by the impact thereby preventing functional retraction of the tape blade after it is extended from the housing.

Typical efforts to improve durability have centered around increasing substrate and over-mold wall thickness. However, as can be appreciated from the failure modes described above, these efforts do not specifically target, and can be ineffective to address, some of the main failure modes that are experienced. In this regard, thickening of portions of the case do not address the fact that some of the main failure modes occur due to temporary separation of the parts of the case, and not due to failure of the case walls themselves.

Accordingly, it may be desirable to design a measuring tape device with a more robust capability to avoid case half separation.

BRIEF SUMMARY OF SOME EXAMPLES

Some example embodiments may enable the provision of a measuring tape that has case halves that are designed to be joined together in a more robust way. In this regard, for example, some embodiments may provide improved fastening structures and/or mating features between the case halves in order to reduce vulnerability to impact damage.

In an example embodiment, a measuring tape device is provided. The measuring tape device may include a housing having an aperture, a reel assembly enclosed within the housing, and a blade having a first end configured to extend from the housing through the aperture and a second end configured to be wound on the reel assembly. The housing may include a first case half and a second case half. The reel assembly may be configured to alternately allow the blade to be withdrawn from the reel assembly through the aperture or received in the aperture onto the reel assembly. The first case half and the second case half may be joined together via threaded fasteners inserted into respective portions of screw bosses formed in corresponding portions of the first and second case halves. Mating features may be provided on the first and second case halves to facilitate joining the first and second case halves. At least some of the mating features may be longer than others of the mating features, or a diameter of the screw bosses is about 1.5 time to about 2.5 times larger than a diameter of the threaded fasteners. In another example embodiment, a measuring tape device is provided. The measuring tape device may include a housing having an aperture, a reel assembly enclosed within the housing, and a blade having a first end configured to extend from the housing through the aperture and a second end configured to be wound on the reel assembly. The housing may include a first case half and a second case half. The reel assembly may be configured to alternately allow the blade to be withdrawn from the reel assembly through the aperture or received in the aperture onto the reel assembly. The first case half and the second case half may be joined together via mating features provided on the first and second case halves to facilitate joining the first and second case halves. At least some of the mating features are about 45% to about 55% longer than others of the mating features.

In yet another example embodiment, a measuring tape device is provided. The measuring tape device may include a housing having an aperture, a reel assembly enclosed within the housing, and a blade having a first end configured to extend from the housing through the aperture and a second end configured to be wound on the reel assembly. The housing may include a first case half and a second case half. The reel assembly may be configured to alternately allow the blade to be withdrawn from the reel assembly through the aperture or received in the aperture onto the reel assembly. The first case half and the second case half may be joined together via threaded fasteners inserted into respective portions of screw bosses formed in corresponding portions of the first and second case halves. A diameter of the screw bosses may be about 1.5 time to about 2.5 times larger than a diameter of the threaded fasteners. The diameter of the screw bosses may be about 7.8% to about 8.8% of a defining diameter of the first and second case halves, and the screw bosses may occupy about 2% to about 3% of a cross sectional area enclosed by the first and second case halves.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1:
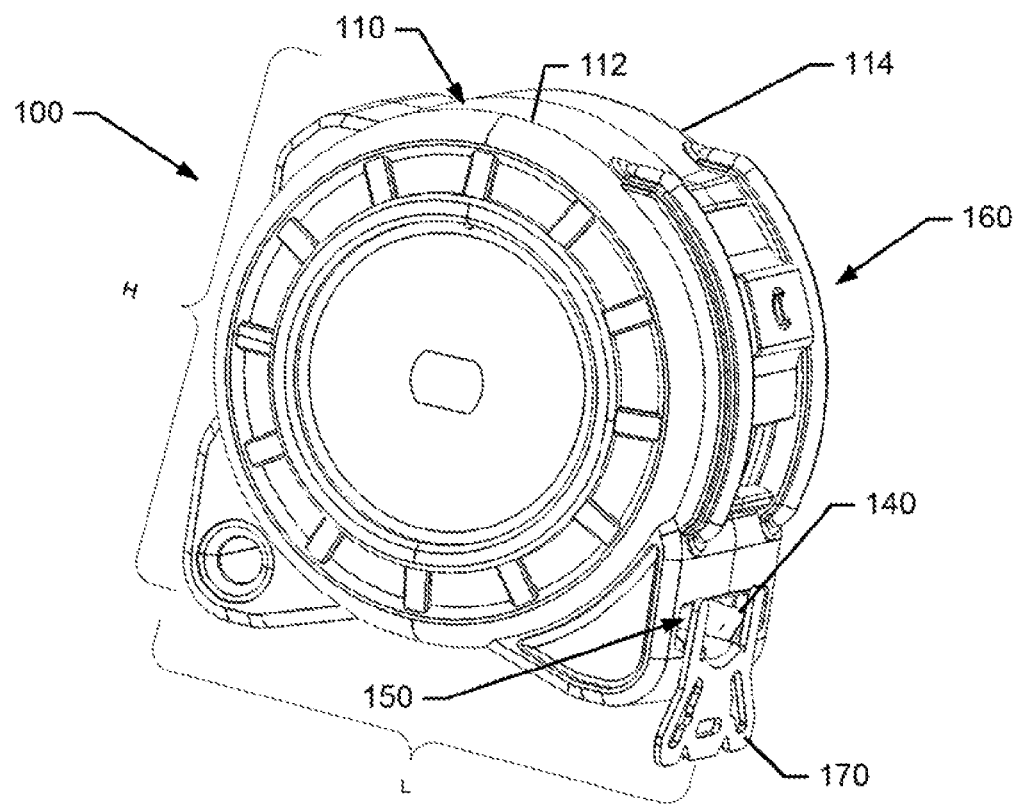
FIG. 1 illustrates a perspective view of a measuring tape device in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, some example embodiments may relate to the provision of a measuring tape device that may have an improved design for resistance to impact damage. This may be accomplished by providing mating features and/or fastening structures that resist separation of the case halves in response to impact and, in some cases, may also guide the case halves back together to ensure proper alignment of the case halves is maintained or restored responsive to such impact. FIG. 1 illustrates a perspective view of a measuring tape device, FIG. 2 illustrates a block diagram of such device, in accordance with an example embodiment, and FIG. 3 illustrates a front view of the measuring tape device to illustrate the case halves thereof.

Figure 2:
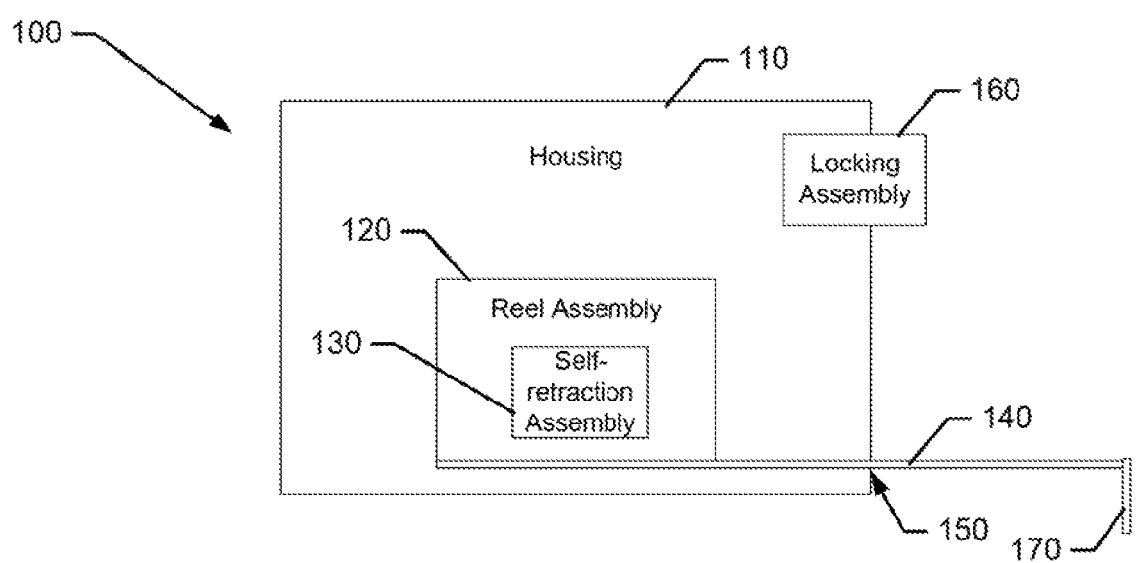
FIG. 2 illustrates a block diagram of the measuring tape device in accordance with an example embodiment.
Figure 3:
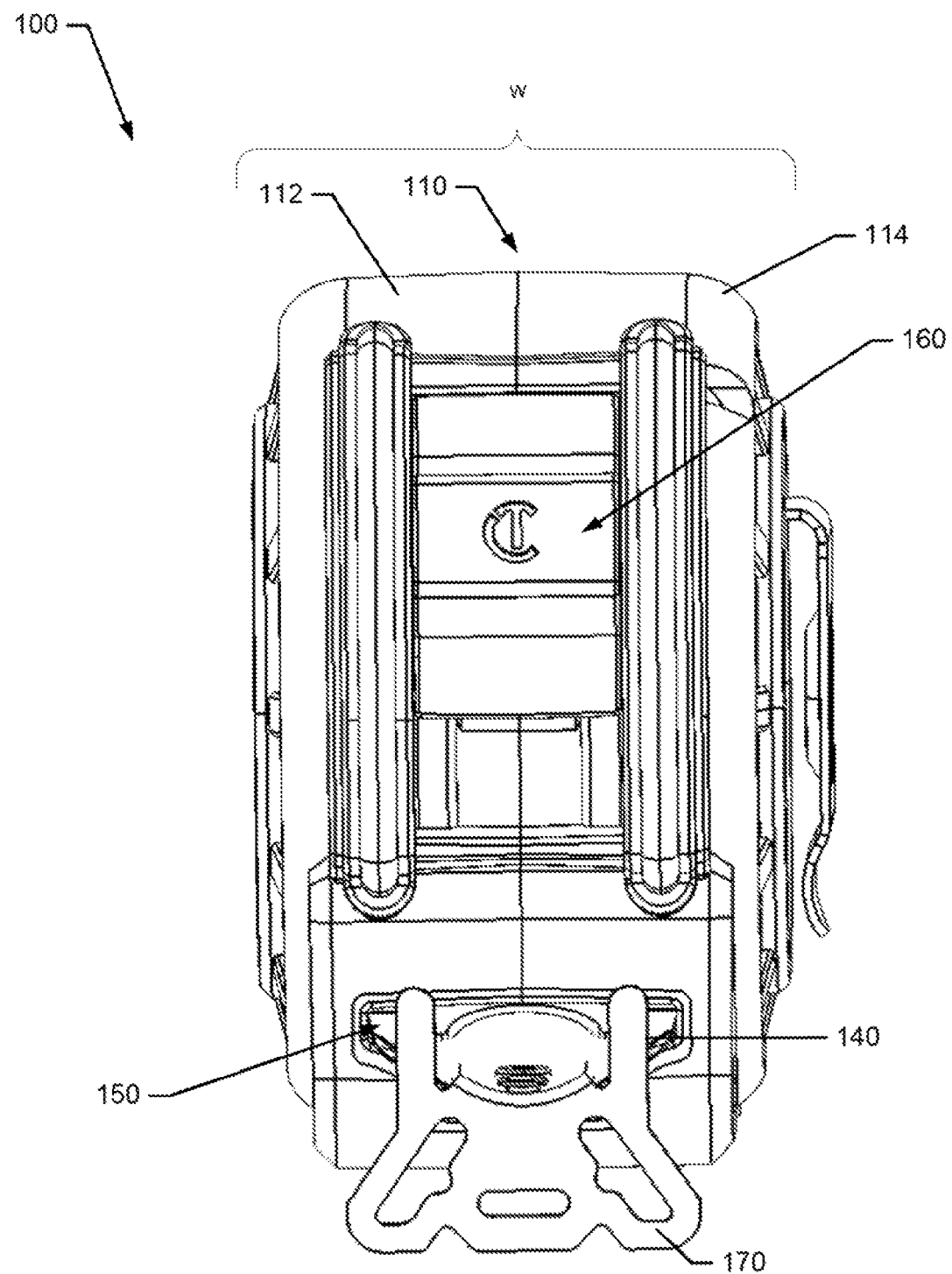
FIG. 3 illustrates a front view of the measuring tape device to illustrate the case halves thereof in accordance with an example embodiment.

Referring now to FIGS. 1-3, a measuring tape device 100 of an example embodiment may include a housing 110 comprising a first case half 112 and a second case half 114. The first and second case halves 112 and 114 may house a reel assembly 120 and a self-retraction assembly 130 therein. A blade 140 (or tape) portion of the device 100 may be wound onto the reel assembly 120. The blade 140 may be paid out through an aperture 150 formed in the housing 110. A locking assembly 160 may be provided to enable the reel assembly 120 to be locked to prevent the self-retraction assembly 130 from retracting the blade 140 when the locking assembly 160 is engaged.

The blade 140 has an end hook 170 disposed at one end thereof, and is affixed to the reel assembly 120 at the other end of the blade 140. The end hook 170 may be affixed (temporarily) to an anchor point on a medium that is to be measured. Once the end hook 170 is affixed to the anchor point, the blade 140 may be paid out of the aperture 150 and unwound from the reel assembly 120. When a desired length of the blade 140 has been paid out, the user can make any necessary markings, readings, etc., associated with measuring scale markings that may be printed on the blade 140. The measuring scale markings generally measure length from the end hook 170 in one or more units, with divisions and subdivisions of such units clearly marked on the blade 140.

By fixing the end hook 170 to the anchor point, the self-retraction assembly 130 (which may be spring loaded in some cases) may be prevented from retracting the paid out portions of the blade 140 into the housing 110 (via the aperture 150). Similarly, when the locking assembly 160 is engaged, a force (e.g., a pinching force) may be placed on the blade 140 to prevent retraction or motion of the reel assembly 120 may otherwise be inhibited to prevent the self-retraction assembly 130 from retracting the paid out portions of the blade 140. However, when the end hook 170 is not anchored and the locking assembly 160 is not engaged, the self-retraction assembly 130 may cause the reel assembly 120 to wind the blade 140 back onto the reel assembly 120.

As mentioned above, impacts may cause separation of the first case half 112 from the second case half 114. Although the separation may be temporary and/or small, such separation can still cause lasting consequences for operation of the measuring tape device 100. For example, if any portion of the blade 140 gets bound in between the first and second case halves 112 and 114, or if the spring and drum of the self-retraction assembly 130 become misaligned, it may not be possible to continue to rewind the blade 140 onto the reel assembly 120 once the blade 140 is withdrawn from the housing 110. Example embodiments increase the size of certain mating features as a function of the overall dimensions of the measuring tape device 100 in order to strike an optimal balance between the size and weight of the measuring tape device 100 and its robustness.

In this regard, the size of the reel assembly 120 (e.g., the diameter of the reel) may be a significant determiner of the minimum dimensions of the measuring tape device 100. The housing 110, which is desirably kept to a light and compact construction, must have at least sufficient height (H), length (L) and width (W) to enclose the reel assembly 120 when the full length of the blade 140 is stored thereon. The diameter of the reel assembly 120 may therefore be referred to as a "defining diameter" for the measuring tape device 100. The defining diameter controls the height (H) and length (L) dimensions for the housing 110 (and therefore also for the first and second case halves 112 and 114). The width of the reel assembly 120 also determines a minimum width for the measuring tape device 100, and the width (W) of the housing 110 will be desirably kept relatively close to the minimum width.

Some example embodiments may define optimal characteristics for certain fastening structures or mating features that join the first and second case halves 112 and 114 together. In this regard, for example, the optimal characteristics may be defined as a function of the defining diameter and/or the width (W) of the housing 110. Fastening structures such as screw bosses may be increased in diameter relative to typical screw bosses. For example, the screw bosses may be increased in diameter to define an optimal screw boss diameter as a function of the defining diameter. Doing so may make the screw bosses much less likely to fail due to cracking, stripping out, or other failure modes, and may also increase the ability of the screw bosses and the fasteners provided therein to retain the first and second case halves 112 and 114 in contact in response to impact. Meanwhile, the mating features may be increased in length to define an optimal mating feature length as a function of the width (W) of the housing 110. Doing so may increase the ability of the measuring tape device 100 to avoid failure on impact since the longer mating features may ensure that contact and alignment is maintained between the first and second case halves 112 and 114 during any minor separation thereof, and the alignment will ensure that the first and second case halves 112 and 114 guide themselves back together in response to impact.

Figure 4:
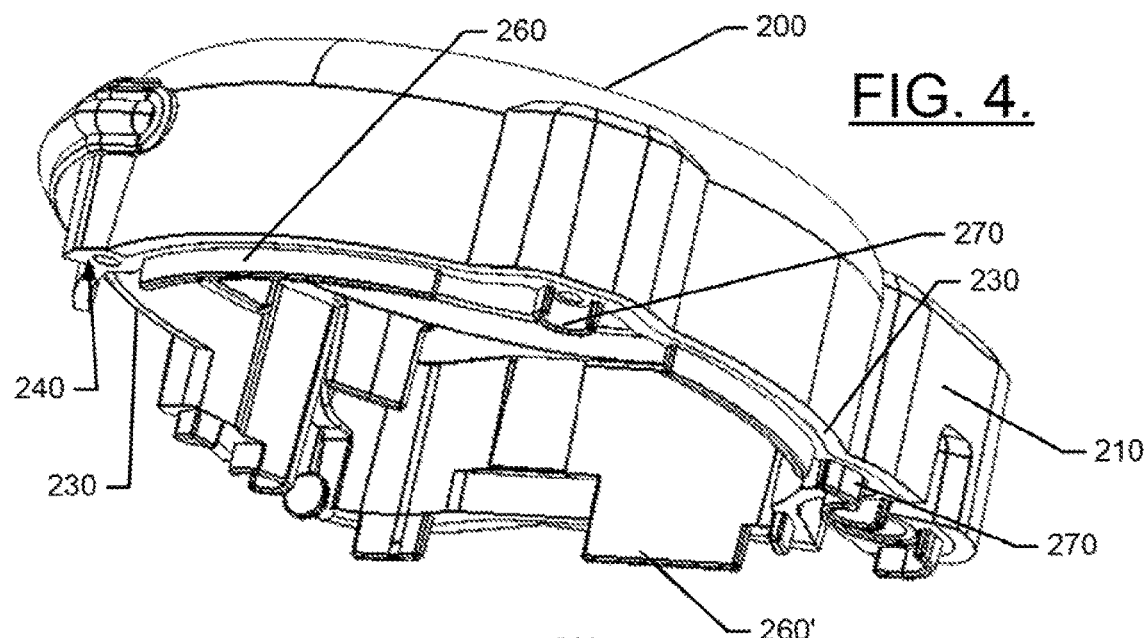
FIG. 4 illustrates a perspective view of an inner portion of a first case half in accordance with an example embodiment.
Figure 5:
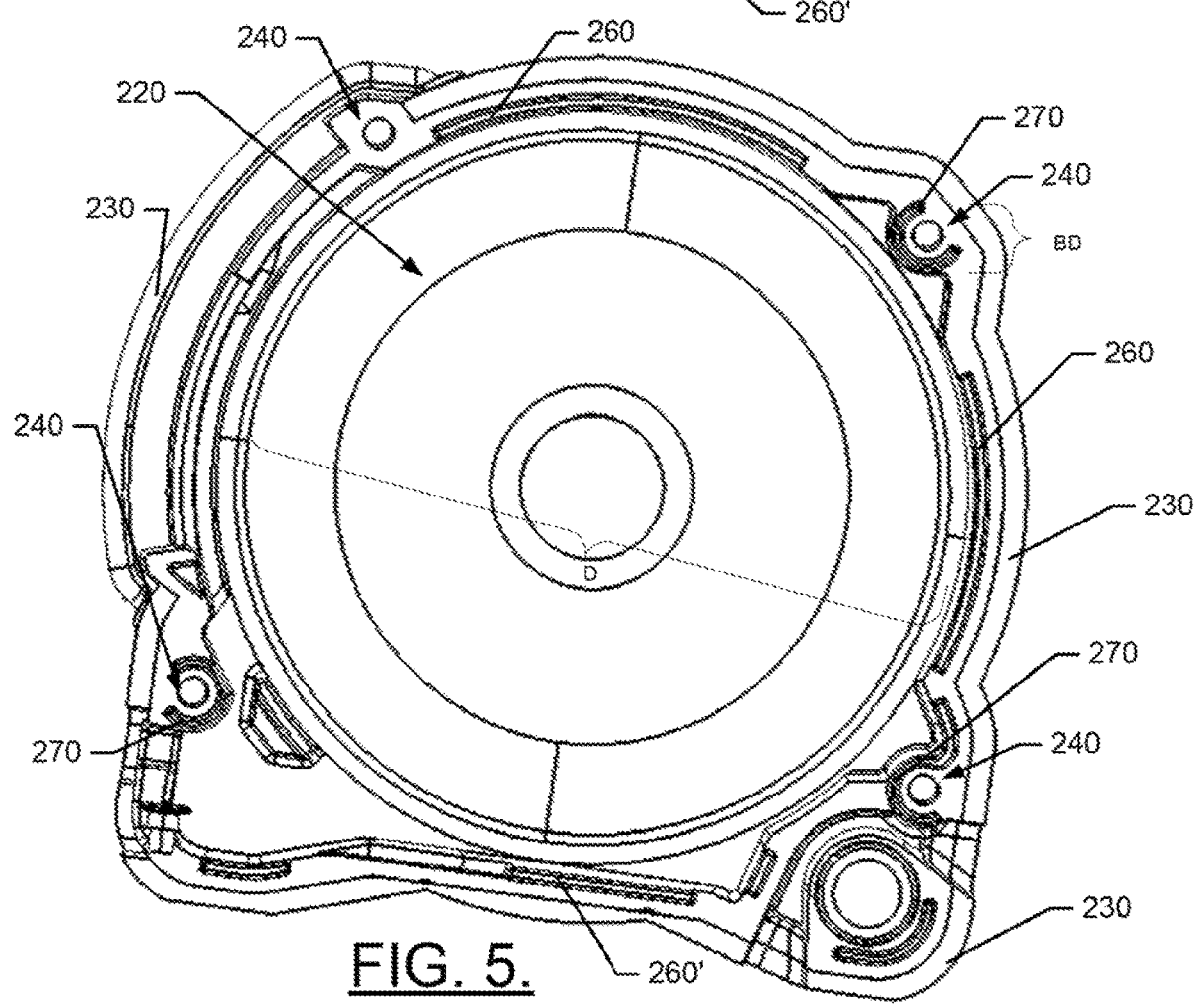
FIG. 5 illustrates a side view of the inner portion of the first case half in accordance with an example embodiment.
Figure 6:
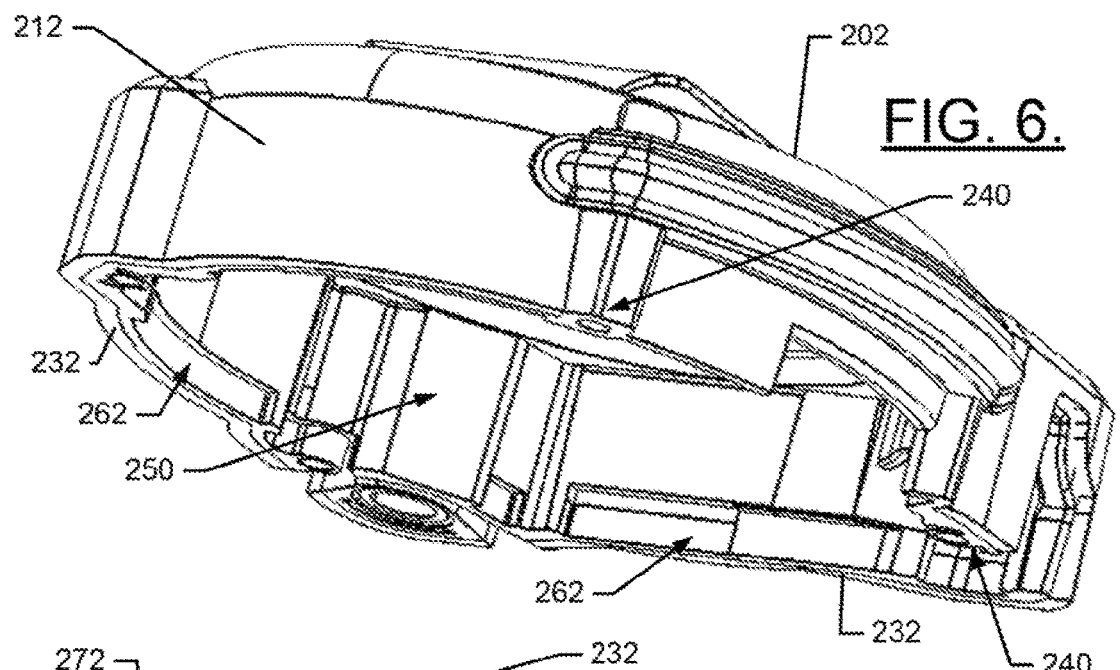
FIG. 6 illustrates a perspective view of an inner portion of a second case half in accordance with an example embodiment.
Figure 7:
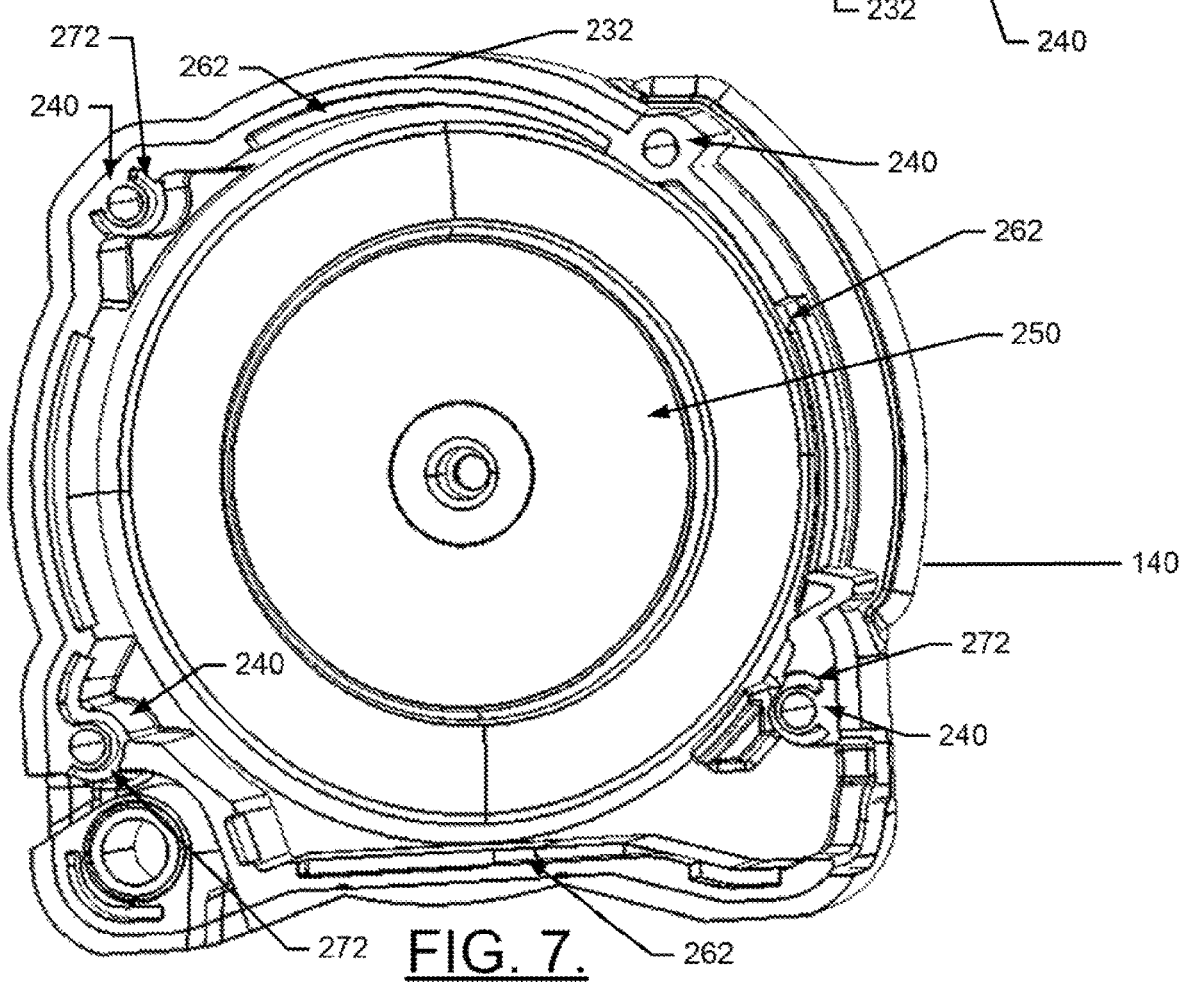
FIG. 7 illustrates a side view of the inner portion of the second case half in accordance with an example embodiment.
Figure 8:
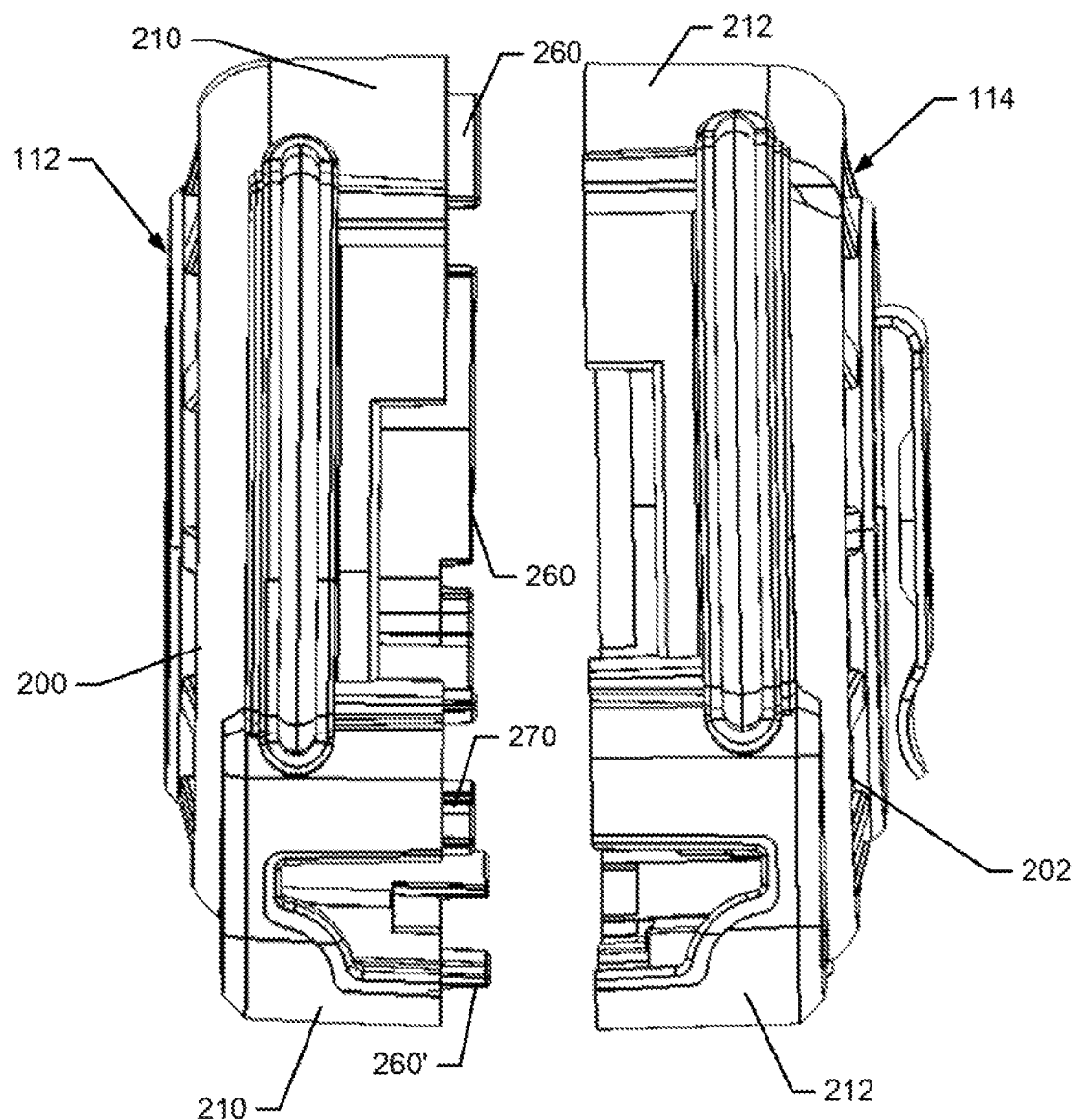
FIG. 8 illustrates a front view of the first and second case halves separated from each other to show the length of the mating features in accordance with an example embodiment.

FIGS. 4-8 illustrate various different views of the first and second case halves 112 and 114 in isolation in order to facilitate a discussion of the optimization of the housing 110 construction in accordance with an example embodiment. In this regard, FIG. 4 illustrates a perspective view of an inner portion of the first case half 112 and FIG. 5 illustrates a side view of the inner portion of the first case half 112. FIG. 6 illustrates a perspective view of an inner portion of the second case half 114 and FIG. 7 illustrates a side view of the inner portion of the second case half 114. FIG. 8 illustrates a front view of the first and second case halves 112 and 114 separated from each other to show the length of the mating features.

Referring now to FIGS. 4-8, the first and second case halves 112 and 114 may each include sidewalls and an end wall that form a cup-like structure. An end wall 200 of the first case half 112 and an end wall 202 of the second case half 114 may each extend substantially parallel to each other when the first and second case halves 112 and 114 are joined together to form the housing 110. Sidewalls 210 of the first case half 112 may extend substantially perpendicularly away from the end wall 200 of the first case half 112. However, there may be a curved transition from the end wall 200 of the first case half 112 to the sidewalls 210 of the first case half 112. Similarly, sidewalls 212 of the second case half 114 may extend substantially perpendicularly away from the end wall 202 of the second case half 114. However, there may also be a curved transition from the end wall 202 of the second case half 114 to the sidewalls 212 of the second case half 114. A receiving opening 220 may be defined between the sidewalls 210 and 212 inside which the reel assembly 120 may be housed. As shown in FIGS. 5 and 7, the defining diameter (D) may be defined at least in part by the radial length (i.e., diameter) of the receiving opening 220.

The first and second case halves 112 and 114 meet each other at a first mating surface 230 and a second mating surface 232, respectively. The first and second mating surfaces 230 and 232 each lie in a plane and, when joined together, meet at a common plane. The first mating surface 230 may be disposed at a distal end of the sidewalls 210 of the first case half 112 and may define a continuous flat surface that lies perpendicular to the axis of rotation of the reel assembly 120 at or near an outer periphery of the side of the first case half 112 that faces the second case half 114. The second mating surface 232 may be disposed at a distal end of the sidewalls 212 of the second case half 114 and may define a continuous flat surface that lies perpendicular to the axis of rotation of the reel assembly 120 at or near an outer periphery of the side of the second case half 114 that faces the first case half 112. The first and second mating surfaces 230 and 232 may meet each other upon assembly of the housing 100 at the common plane to define a nearly continuous enclosure around the reel assembly 120 and the self-retraction assembly 130 within the receiving opening 220.

Screw bosses 240 may be incorporated into the first and second mating surfaces 230 and 232 to enable fasteners (e.g., screws) to be threaded therein to hold the first case half 112 and the second case half 114 together. In this regard, the first and second mating surfaces 230 and 232 may substantially mirror each other, and the screw bosses 240 may be positioned to also mirror each other so that any portion of one of the screw bosses 240 that lies in the first case half 112 will align with a corresponding portion of one of the screw bosses 240 that lies in the second case half 114 when the first and second mating surfaces 230 and 232 are mated together.

Figure 9:
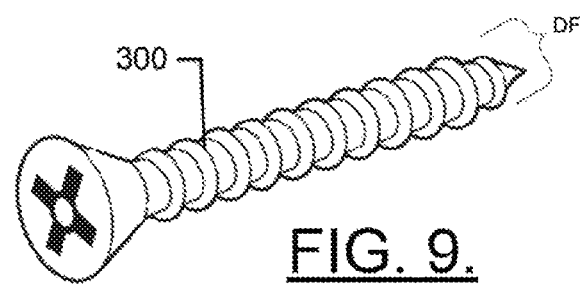
FIG. 9 illustrates a perspective view of a self-threading fastener in accordance with an example embodiment.

The screw bosses 240 may be mounting features that are formed as substantially hollow cylindrical structures configured to receive a screw in the internally hollow portion thereof. Although the outer shape of the screw bosses 240 need not necessarily be perfectly cylindrical, a general cylindrically shaped structure is formed (e.g., during molding) of the base material (e.g., resin, plastic, polymers, or other rigid materials such as, for example, acrylonitrile butadiene styrene (ABS)) used to form the first and second case halves 112 and 114. The screw bosses 240 could be threaded. However, in an example embodiment, the screw bosses 240 may be initially be formed without any threads therein, and a thread forming fastener 300 (see FIG. 9) may be used to form threads in the screw bosses 240 when the thread forming fastener 300 is inserted therein.

The screw bosses 240 may be formed to have a diameter (DB) that is substantially the same for each screw boss 240 and portion thereof. Moreover, the diameter (DB) of the screw bosses 240 may be optimized as a function of the defining diameter (D), as a function of the cross sectional area enclosed by the meeting of the first and second mating surfaces 230 and 232 and/or as a function of the diameter (DF) of the thread forming fastener 300 (see FIG. 9). In this regard, for example, the diameter (DB) of the screw bosses 240 may be about double (e.g., from 1.5× to 2.5×) the diameter (DF) of the thread forming fastener 300. In this example, if the diameter (DF) of the thread forming fastener 300 is 0.125 inches, the diameter (DB) of the screw bosses 240 may be about 0.25 inches.

Additionally or alternatively, the diameter (DB) of the screw bosses 240 may be structured to occupy about 2.4% (e.g., from 2% to 3%) of the cross sectional area enclosed by the meeting of the first and second mating surfaces 230 and 232. Thus, for this example in which the diameter (DB) of the screw bosses 240 is about 0.25 inches, the cross sectional area enclosed by the meeting of the first and second mating surfaces 230 and 232 (e.g., the area enclosed, normal to the centerline of the case, as a line drawn around the perimeter of the case at the meeting of the first and second case halves 112 and 114, substrate and over-mold included) may be about 8.14 square inches.

Additionally or alternatively, the diameter (DB) of the screw bosses 240 may be structured to have a ratio to the defining diameter (D) of about 8.3% (e.g., from about 7.8% to about 8.8%). It is generally advantageous to maximize each of the relationships discussed above while still maintaining good clearance for proper operation of the reel assembly 120. Thus, for example, the relationships discussed above are selected to be as large as they can be while still keeping the housing 110 as small and light as it can be while still enabling the reel assembly 120 and the self-retraction assembly 130 to operate properly. The particular relationships identified above can be followed for any size of measuring tape device 100 in order to give optimal balance between minimizing weight and size, while maximizing strength and durability.

As perhaps best seen in FIG. 8, one or both of the first and second case halves 112 and 114 may include mating features that extend from and are received within corresponding portions of the first and second case halves 112 and 114. The mating features may include protruding members that extend perpendicularly away from a respective one of the first and second mating surfaces 230 and 232 and corresponding receiving slots that are shaped to receive respective ones of the protruding members. Some of the protruding members (e.g., case alignment protruding members 260) may be formed to correspond to edges of the sidewalls 210 or 212 and/or edges defining the receiving opening 220. Others of the protruding members (e.g., boss alignment protruding members 270) may be formed to facilitate alignment of the screw bosses 240 when the first and second case halves 112 and 114 are joined together. As used herein, the term "protruding members" can therefore be understood to refer to either or both of the case alignment protruding members 260 and the boss alignment protruding members 270.

In this example, the first case half 112 includes the case alignment protruding members 260 and boss alignment protruding members 270, and the second case half 114 includes corresponding receiving slots 262 and 272, which may be shaped to receive respective ones of the protruding members. However, it should be appreciated that all or some of the protruding members could extend from the second case half 114 into respective instances of the receiving slots 262 and 272 positioned at the first case half 112.

In this example, some of the protruding members may be longer than others. In this regard, all of the protruding members may generally have the same length (e.g., 0.110 inches) except for protruding members that are in a critical area. Based on experience regarding failure modes, and based on testing regarding the same, the bottom portion of the housing 110 (i.e., the portion of the housing 110 along which the blade 140 extends prior to exiting the aperture 150) may be considered as the critical area since it is most prone to failure during impact events. Accordingly, at least some of the protruding members in the critical area may have a length that is about 50% (e.g., 45% to 55%) longer than other protruding members. In this example, case alignment protruding members 260', which are located in the critical area, are about 50% longer than other protruding members. Thus, the case alignment protruding members 260' in the critical area are about 0.165 inches long in this example. The case alignment protruding members 260' in the critical area may also or alternatively have a length that is selected to be about 8.8% of the width (W) of the housing 110. Thus, for example, the case alignment protruding members 260' in the critical area may have a length of about 8.3% to about 9.3% of the width (W) of the housing 110.

In an example embodiment, a measuring tape device is provided. The measuring tape device may include a housing having an aperture, a reel assembly enclosed within the housing, and a blade having a first end configured to extend from the housing through the aperture and a second end configured to be wound on the reel assembly. The housing may include a first case half and a second case half. The reel assembly may be configured to alternately allow the blade to be withdrawn from the reel assembly through the aperture or received in the aperture onto the reel assembly. The first case half and the second case half may be joined together via threaded fasteners inserted into respective portions of screw bosses formed in corresponding portions of the first and second case halves. Mating features may be provided on the first and second case halves to facilitate joining the first and second case halves. At least some of the mating features may be longer than others of the mating features, or a diameter of the screw bosses is about 1.5 time to about 2.5 times larger than a diameter of the threaded fasteners.

In some embodiments, the features of the device described above may be augmented or modified, or additional features may be added. These augmentations, modifications and additions may be optional and may be provided in any combination. Thus, although some example modifications, augmentations and additions are listed below, it should be appreciated that any of the modifications, augmentations and additions could be implemented individually or in combination with one or more, or even all of the other modifications, augmentations and additions that are listed. As such, for example, in some cases both the at least some of the mating features may be longer than the others of the mating features, and the diameter of the screw bosses may be about 1.5 time to about 2.5 times larger than the diameter of the threaded fasteners. In some cases, the at least some of the mating features may be about 45% to about 55% longer than the others of the mating features. Alternatively or additionally, the at least some of the mating features are about 8.3% to about 9.3% of a total width of the first and second case halves. In an example embodiment, the at least some of the mating features may include protruding members disposed at the first case half to extend into respective receiving slots disposed at the second case half. In some cases, the protruding members may be case alignment protruding members disposed at a bottom portion of the housing alongside which the blade extends prior to extending through the aperture. In an example embodiment, the mating features may include protruding members disposed only on the first case half to extend into respective receiving slots disposed only on the second case half. In some cases, the diameter of the screw bosses may be about 7.8% to about 8.8% of a defining diameter of the first and second case halves. In an example embodiment, the screw bosses occupy about 2% to about 3% of a cross sectional area enclosed by the first and second case halves. In some cases, the diameter of the screw bosses is about 7.8% to about 8.8% of a defining diameter of the first and second case halves, and the screw bosses occupy about 2% to about 3% of a cross sectional area enclosed by the first and second case halves.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A measuring tape device comprising:
 a housing having an aperture, the housing comprising a first case half and a second case half;
 a reel assembly enclosed within the housing; and
 a blade having a first end configured to extend from the housing through the aperture and a second end configured to be wound on the reel assembly;
 wherein the reel assembly is configured to alternately allow the blade to be withdrawn from the reel assembly through the aperture or received in the aperture onto the reel assembly,
 wherein the first case half and the second case half are joined together via threaded fasteners inserted into respective portions of screw bosses formed in corresponding portions of the first and second case halves,
 wherein mating features are provided on the first and second case halves to facilitate joining the first and second case halves,
 wherein the at least some of the mating features are about 45% to about 55% longer than the others of the mating features, and
 wherein the at least some of the mating features include protruding members disposed at the first case half to extend into respective receiving slots disposed at the second case half.

2. The device of claim 1, wherein the diameter of the screw bosses is about 1.5 time to about 2.5 times larger than the diameter of the threaded fasteners.

3. The device of claim 2, wherein the diameter of the screw bosses is about 7.8% to about 8.8% of a defining diameter of the first and second case halves.

4. The device of claim 2, wherein the diameter of the screw bosses is about 7.8% to about 8.8% of a defining diameter of the first and second case halves, and
 wherein the screw bosses occupy about 2% to about 3% of a cross sectional area enclosed by the first and second case halves.

5. The device of claim 1, wherein the protruding members are case alignment protruding members disposed at a bottom portion of the housing alongside which the blade extends prior to extending through the aperture.

6. The device of claim 1, wherein the at least some of the mating features are about 8.3% to about 9.3% of a total width of the first and second case halves.

7. The device of claim 1, wherein the screw bosses occupy about 2% to about 3% of a cross sectional area enclosed by the first and second case halves.

8. A measuring tape device comprising:
 a housing having an aperture, the housing comprising a first case half and a second case half;
 a reel assembly enclosed within the housing; and
 a blade having a first end configured to extend from the housing through the aperture and a second end configured to be wound on the reel assembly;
 wherein the reel assembly is configured to alternately allow the blade to be withdrawn from the reel assembly through the aperture or received in the aperture onto the reel assembly,
 wherein the first case half and the second case half are joined together via threaded fasteners inserted into respective portions of screw bosses formed in corresponding portions of the first and second case halves,
 wherein mating features are provided on the first and second case halves to facilitate joining the first and second case halves,
 wherein at least some of the mating features are longer than others of the mating features,
 wherein the at least some of the mating features are about 8.3% to about 9.3% of a total width of the first and second case halves,
 wherein the at least some of the mating features include protruding members disposed at the first case half to extend into respective receiving slots disposed at the second case half, and
 wherein the protruding members are case alignment protruding members disposed at a critical area defined at a bottom portion of the housing alongside which the blade extends prior to extending through the aperture.

9. The device of claim 1, wherein the protruding members are disposed only on the first case half to extend into respective receiving slots disposed only on the second case half.

10. A measuring tape device comprising:
 a housing having an aperture, the housing comprising a first case half and a second case half;
 a reel assembly enclosed within the housing; and
 a blade having a first end configured to extend from the housing through the aperture and a second end configured to be wound on the reel assembly;
 wherein the reel assembly is configured to alternately allow the blade to be withdrawn from the reel assembly through the aperture or received in the aperture onto the reel assembly,
 wherein the first case half and the second case half are joined together via mating features provided on the first and second case halves to facilitate joining the first and second case halves,
 wherein the at least some of the mating features include protruding members disposed at the first case half to extend into respective receiving slots disposed at the second case half, and
 wherein the protruding members are case alignment protruding members disposed at a critical area defined at a bottom portion of the housing alongside which the blade extends prior to extending through the aperture.

11. The device of claim 10, wherein the at least some of the mating features are about 8.3% to about 9.3% of a total width of the first and second case halves.

12. The device of claim 10, wherein the protruding are members disposed only on the first case half to extend into respective receiving slots disposed only on the second case half.

13. A measuring tape device comprising:
- a housing having an aperture, the housing comprising a first case half and a second case half;
- a reel assembly enclosed within the housing; and
- a blade having a first end configured to extend from the housing through the aperture and a second end configured to be wound on the reel assembly;
- wherein the reel assembly is configured to alternately allow the blade to be withdrawn from the reel assembly through the aperture or received in the aperture onto the reel assembly,
- wherein the first case half and the second case half are joined together via threaded fasteners externally inserted into respective portions of screw bosses formed in corresponding portions of the first and second case halves such that the externally inserted threaded fasteners extend from and secure an external surface of the first and second case halves into an internal screw boss disposed on the other of the first and second case halves,
- wherein a diameter of the screw bosses is about 1.5 time to about 2.5 times larger than a diameter of the threaded fasteners,
- wherein the diameter of the screw bosses is about 7.8% to about 8.8% of a defining diameter of the first and second case halves, and
- wherein the screw bosses occupy about 2% to about 3% of a cross sectional area enclosed by the first and second case halves.

* * * * *